United States Patent [19]

Gibson

[11] Patent Number: 5,229,847
[45] Date of Patent: Jul. 20, 1993

[54] TELEVISION SIGNAL PROCESSING SYSTEM INCLUDING MODULATED AUXILIARY CARRIER

[75] Inventor: James J. Gibson, Princeton, N.J.
[73] Assignee: General Electric, Princeton, N.J.
[21] Appl. No.: 729,242
[22] Filed: Jul. 12, 1991
[51] Int. Cl.$^5$ ............... H04N 11/06; H04N 11/00; H04N 9/64
[52] U.S. Cl. ........................... 358/12; 358/36
[58] Field of Search ............ 358/12, 141, 142, 36, 358/24, 23

[56] References Cited

U.S. PATENT DOCUMENTS

| | | | |
|---|---|---|---|
| 4,091,410 | 5/1978 | Citta | 358/24 |
| 4,839,720 | 6/1989 | Isnardi | 358/12 |
| 5,053,858 | 10/1991 | Koslou et al. | 358/12 |
| 5,070,396 | 12/1991 | Isnardi et al. | 358/12 |
| 5,115,301 | 5/1992 | Hurst, Jr. | 358/12 |
| 5,122,868 | 6/1992 | Isnardi | 358/36 |

FOREIGN PATENT DOCUMENTS 60-170386 4/1985 Japan ..................... 358/12
2-207692 8/1990 Japan .

OTHER PUBLICATIONS

Report by David Sarnoff Research Center, Princeton, N.J., to the Federal Communications Commission, System Description, Advanced Compatible Television, Dec. 31, 1989.

Primary Examiner—James J. Groody
Assistant Examiner—Safet Metjahic
Attorney, Agent, or Firm—Joseph S. Tripoli; Eric P. Herrmann; Ronald H. Kurdyla

[57] ABSTRACT

In one embodiment an encoded compatible widescreen television signal includes first and second auxiliary carriers amplitude modulated with side panel chrominance information. The first and second auxiliary carriers exhibit a significant phase shift (e.g., 90°) relative to a chrominance subcarrier modulated with main panel information, and exhibit phase reversal from field to field. In another embodiment, a phase shifted, amplitude modulated and field phase modulated auxiliary carrier is derived from a modulated chrominance subcarrier.

18 Claims, 5 Drawing Sheets

1

TELEVISION SIGNAL PROCESSING SYSTEM INCLUDING MODULATED AUXILIARY CARRIER

FIELD OF THE INVENTION

This invention concerns a system for encoding additional television information by means of a phase controlled amplitude modulated auxiliary carrier.

BACKGROUND OF THE INVENTION

A conventional television system, such as a system in accordance with the NTSC broadcast standard adopted in the United States and elsewhere, processes a television signal representative of an image with a standard 4:3 aspect ratio (the ratio of the width to the height of a displayed image). Recently, there has been interest in using wider aspect ratio images for television systems, such as 5:3, 16:9 and 2:1, since these wider aspect ratios more nearly approximate or equal the aspect ratio of the human eye compared to the 4:3 aspect ratio of a standard television display.

Compatible advanced television systems for producing wide aspect ratio images are described, for example, in U.S. Pat. No. 4,816,899—Strolle et al., in U.S. Pat. No. 4,855,811—Isnardi, and in (allowed) co-pending U.S. patent application Ser. No. 509,384, U.S. Pat. No. 5,053,858 issued Oct. 1991) of J. L. Koslov et al. titled "Chrominance Signal Processing Apparatus for a Widescreen Television System". In these systems certain baseband side panel information is encoded by time expansion and amplitude modulation of a field phase modulated auxiliary subcarrier of a type sometimes referred to as a Fukinuki carrier. A Fukinuki carrier is related to a standard interlaced carrier such as the NTSC color subcarrier, but is located in different quadrants of the vertical-temporal frequency spectrum. Such an auxiliary carrier can be generated by inverting the phase of an interlaced carrier on alternate image fields. In the system described by Koslov et al., center panel "I" and "Q" color difference signal image information respectively amplitude modulates in-phase and quadrature phased standard 3.58 MHz color subcarrier components. In addition, quadrature phased Fukinuki-type auxiliary subcarrier components also at 3.58 MHz are amplitude modulated by side panel "I" color difference information (the inphase component), and by side panel "Q" color difference information together with high frequency side panel luminance information (the quadrature component). A system of this type is also described in a report submitted by the David Sarnoff Research Center, Princeton, N.J., to the Federal Communications Commission in the United States, titled "System Description, Advanced Compatible Television", dated Dec. 31, 1989.

A field phase and amplitude modulated Fukinuki-type carrier generates complementary color flicker which typically is not visible because of the complementary colors involved, and because in theory luminance information is not involved. However, it is herein recognized that, in practice, nonlinearities associated with display devices (e.g., kinescopes, among others) convert otherwise imperceptible chrominance flicker into visible luminance flicker. More specifically, practical display devices such as kinescopes typically exhibit a nonlinear transfer characteristic in the active region above black level to white level, even if an inherent nonlinear transfer characteristic in this region is attempted to be corrected at the transmitter via a so-called "gamma correction" of the television signal. This result occurs due to dissimilarities among display devices, and to signal processing effects. Another source of non-linearity in a display device is the region below black level in which the display device is cut-off.

Luminance flicker associated with a Fukinuki-type modulated carrier therefore can result from display device nonlinearities in the active region. Such luminance flicker also can result from carrier modulation excursions into the cut-off region. Noticeable luminance flicker can occur when the center panel and the side panels contain highly saturated colors, e.g., when the center and side panels exhibited similar saturated colors such as blue (sky) or green (grass). Uniform saturated blue color was found to cause very visible flicker, partly because saturated blue color exhibits a low luminance level. The described luminance flicker problem is addressed by the present invention, which significantly reduces or eliminates such luminance flicker.

SUMMARY OF THE INVENTION

In accordance with the principles of the present invention, a field phase modulated auxiliary subcarrier, amplitude modulated with auxiliary information, exhibits a significant phase shift relative to a standard chrominance subcarrier. In an illustrated embodiment of the invention, an in-phase standard color subcarrier component is amplitude modulated with center panel "I" color difference information, and a quadrature phased standard color subcarrier component is amplitude modulated with center panel "Q" color difference signal information. A first field phase modulated auxiliary carrier component amplitude modulated with side panel "I" color difference information exhibits a quadrature phase relationship with respect to the inphase "I" modulated color subcarrier. A second field phase modulated auxiliary carrier component amplitude modulated with side panel "Q" color difference information is generated in phase quadrature with the first auxiliary carrier component.

In accordance with a feature of the invention, a field phase modulated auxiliary carrier to be amplitude modulated with auxiliary information is derived from a modulated chrominance subcarrier.

BRIEF DESCRIPTION OF THE DRAWING

FIGS. 1 and 1a show a portion of an NTSC compatible widescreen transmitter/encoder including apparatus according to the present invention for developing a modulated auxiliary carrier signal.

DETAILED DESCRIPTION

Figure 1:
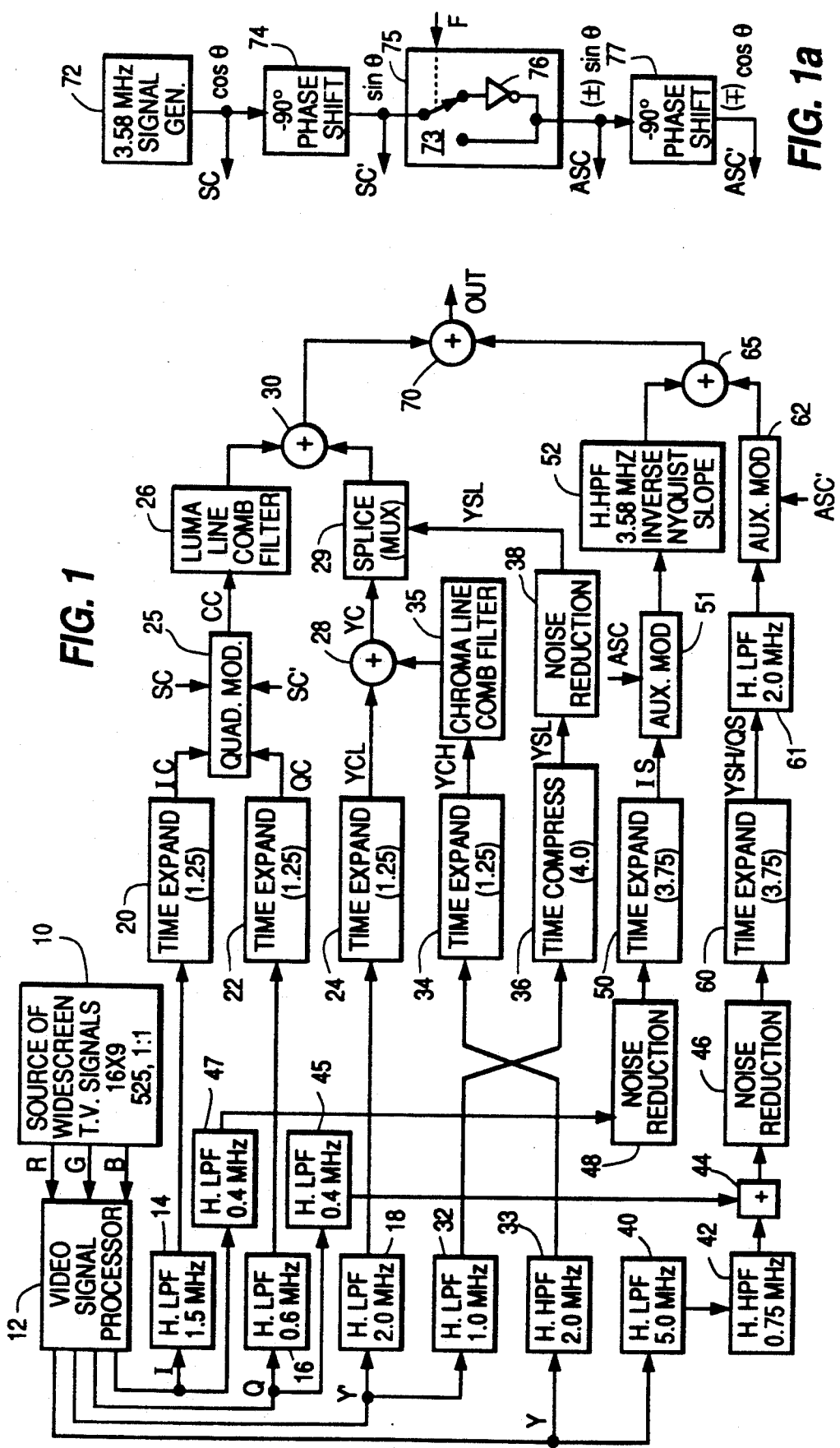

In the NTSC compatible widescreen transmitter/encoder of FIG. 1, a widescreen (wide aspect ratio) television signal source 10, such as a color television camera, provides a 16×9 wide aspect ratio 1:1 progressively scanned (non-interlaced) television signal with gamma-corrected color components R, G and B. These signals are processed by a video signal processor 12 to provide luminance output signals Y, Y' and color difference output signals I and Q. Processor 12 includes circuits for translating the R, G, B input signals to I, Q, Y format, vertical-temporal filters for pre-filtering each of the I, Q, Y signals, intraframe averagers, and progressive scan to interlaced scan converters for each of the I, Q, Y signals. Output signals I, Q and Y from processor 12 are progressive scan signals. An output signal Y' is a 525 line interlaced luminance signal.

The luminance and color difference output signals from processor 12 have been subjected to a process of intraframe averaging within processor 12. Intraframe averaging is a signal conditioning technique that prepares two signals for mutual combing so that they can be recovered efficiently and accurately afterwards, such as by means of a field storage device in a receiver. More specifically, with this technique a group of pixels (picture elements) one field (262 H) apart is made to contain pixels of identical value such as by replacing original pixel values with their average value. In this example the full bandwidths of the center and side panel color difference signals are intraframe processed, side panel high frequency luminance information is intraframe processed, and center panel luminance information is intraframe processed above a given frequency, e.g., 1.5 MHz. Additional information concerning intraframe processing in this regard is found in previously mentioned U.S. Pat. No. 4,855,811—Isnardi and in the allowed Koslov et al. U.S. patent application.

Figure 4:
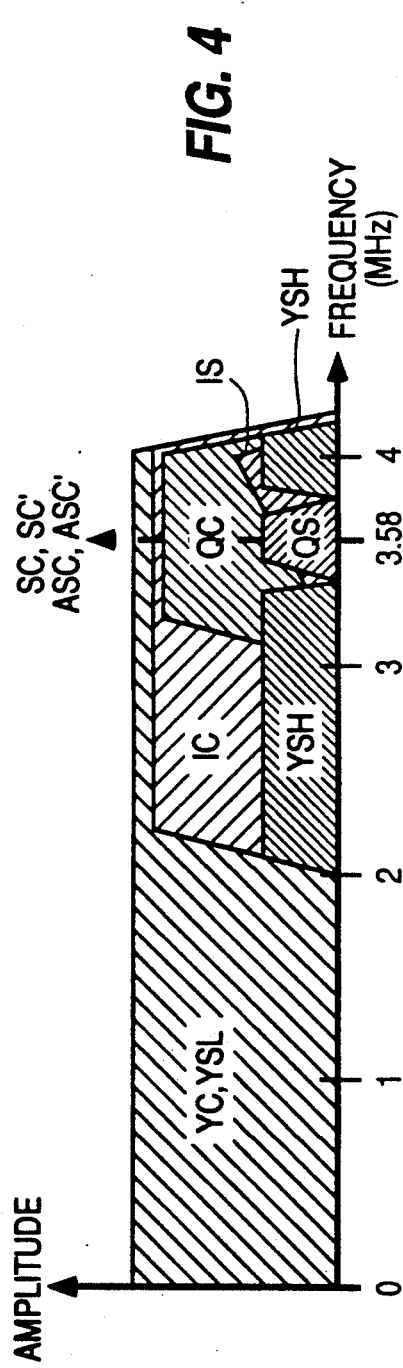
FIG. 4 shows an amplitude-frequency spectrum of a television signal encoded by the encoder system of FIG. 1.

Encoding of the main (i.e., "center") panel information will be discussed first. Color difference signals I, Q and luminance signal Y' from unit 12 are respectively filtered by filters 14, 16 and 18 before being time expanded by units 20, 22 and 24, respectively. Units 20, 22 and 24 exhibit a time expansion factor of 1.25 and operate only on the center (main) panel portion of the I, Q, Y' signals from filters 14, 16 and 18. Thus time expanders 20 and 22 respectively provide output center panel color difference signals IC and QC. The frequency spectrum of certain signals processed by the system of FIG. 1, including center panel signals IC, QC, YC and side panel signals IS, QS, YSH and YSL as will be discussed, is shown in FIG. 4. Time expander 24 provides an output luminance center panel low frequency signal YCL. Signals IC and QC respectively double sideband symmetrically modulate 3.58 MHz quadrature phased subcarrier components SC and SC' in a modulator 25 to produce a modulated center panel chrominance signal CC. This signal is processed by a luminance line comb filter 26 to remove luminance information before being applied to a center panel chrominance input of an adder 30.

The center panel luminance signal input to adder 30 is developed as follows. The Y luminance signal from processor 12 is high pass filtered by a unit 33 and time expanded by a unit 34, which operates only during the center panel interval, to develop a center panel high frequency luminance signal YCH. This signal is processed by a chrominance line comb filter 35 to remove chrominance information before being combined with center panel low frequency luminance signal YCL in adder 28 to produce a center panel luminance signal YC.

Expanded center panel luminance signal YC is spliced to compressed side panel low frequency luminance information YSL by means of a multiplexer 29. Briefly, as discussed in detail in U.S. Pat. No. 4,855,811—Isnardi, signal YSL constitutes time compressed low frequency left and right side panel luminance information which is placed in left and right horizontal overscan regions of the center panel signal by means of multiplexer 29. Signal YSL is obtained by filtering signal Y' from processor 12 by means of a horizontal low pass filter 32, then selectively time compressing the side panel portions of the filtered signal by means of a compressor 36 which operates only during the side panel intervals. Signal YSL from compressor 36 is processed by a noise reduction unit 38 for improving the signal-to-noise characteristic of signal YSL before being applied to splicer 29. The output of multiplexer/splicer 29 is applied to the luminance input of center panel signal combiner 30. Noise reduction unit 38, as well as noise reduction units 46 and 48, are amplitude compansion units having similar complementary counterpart units with inverse operating characteristics at a receiver.

High frequency side panel information is processed as follows. The "I" color difference component from processor 12 is filtered by a low pass filter 47 to produce an I signal which is processed by noise reduction unit 48. The output signal from unit 48 is time expanded during side panel intervals by a time expander 50 to produce side panel color difference component IS. This signal is applied to an auxiliary modulator 51 for double sideband amplitude modulating an auxiliary subcarrier ASC. Auxiliary subcarrier ASC exhibits a frequency of 3.58 MHz, the frequency of the standard chrominance subcarrier, but exhibits a field modulated phase which inverts from field-to-field unlike the standard chrominance subcarrier provided by modulator 25. Specifically, the phase of signal ASC inverts every field, during the vertical blanking interval of the interlaced television signal.

The modulated signal from unit 51 is applied to a 3.58 MHz horizontal high pass filter 52 having an inverse Nyquist slope. Filter 52 mirrors a filter at a receiver having a Nyquist slope to achieve a desired amplitude response at a receiver demodulator. Specifically, the cascade of inverse Nyquist slope filter 52 at the encoder with a complementary Nyquist slope filter at a receiver decoder (as will be seen in FIG. 2) produces a desired flat amplitude response for high frequency side panel luminance signal YSH when demodulated at the receiver. Such cascade of Nyquist slope filters also assures that modulated auxiliary subcarrier ASC exhibits symmetrical double sideband IS information so that proper quadrature demodulation is achieved at the decoder, i.e., so that signal IS maintains a desired phase characteristic and does not crosstalk into components YSH or QS.

Side panel high frequency luminance information and side panel color difference component "Q" are combined for processing. The Q output signal from processor 12 is conveyed via a horizontal low pass filter 45 to a combiner 44, where it is combined with signal Y from unit 12 after filtering by a horizontal low pass filter 40 and a MHz horizontal high pass filter 42. The output signal from combiner 44 is processed by noise reduction unit 46 and afterwards time expanded by a unit 60. Expander unit 60 operates during the side panel intervals for producing combined side panel highs signal YSH/QS, i.e., side panel high frequency luminance information combined with side panel Q color difference information. Because time expander 60 is not ideal, low energy repeat spectra are generated above 2.0 MHz. Low pass filter 61 removes these repeat spectra and prevents them from cross-talking into the main (center) panel component after modulation.

Combined signal YSH/QS is coupled via filter 61 to an auxiliary modulator 62, which modulates an auxiliary 3.58 MHz subcarrier component ASC' with the output signal from filter 61. Auxiliary carrier ASC' is modulated with QS information in symmetrical double sideband form, and with YSH information forming a lower single sideband component in vestigial sideband form. The single sideband latter modulation component is produced as a result of the effect of a band-limiting 4.2 MHz channel filter (not shown) which acts on the encoder output signal from a combiner 70 prior to being broadcast. Subcarrier ASC' is in phase quadrature with subcarrier ASC and exhibits similar phase inversion from field to field. The output signal from modulator 62 and the output signal from filter 52 are combined by an adder 65. An adder 70 combines the output signals from adders 30 and 65 to produce an output compatible widescreen television signal. This signal is afterwards low pass filtered by the 4.2 MHz channel filter (not shown) to restrict the output signal to the standard NTSC channel bandwidth before being applied to an RF transmitter for broadcast.

Figure 7:
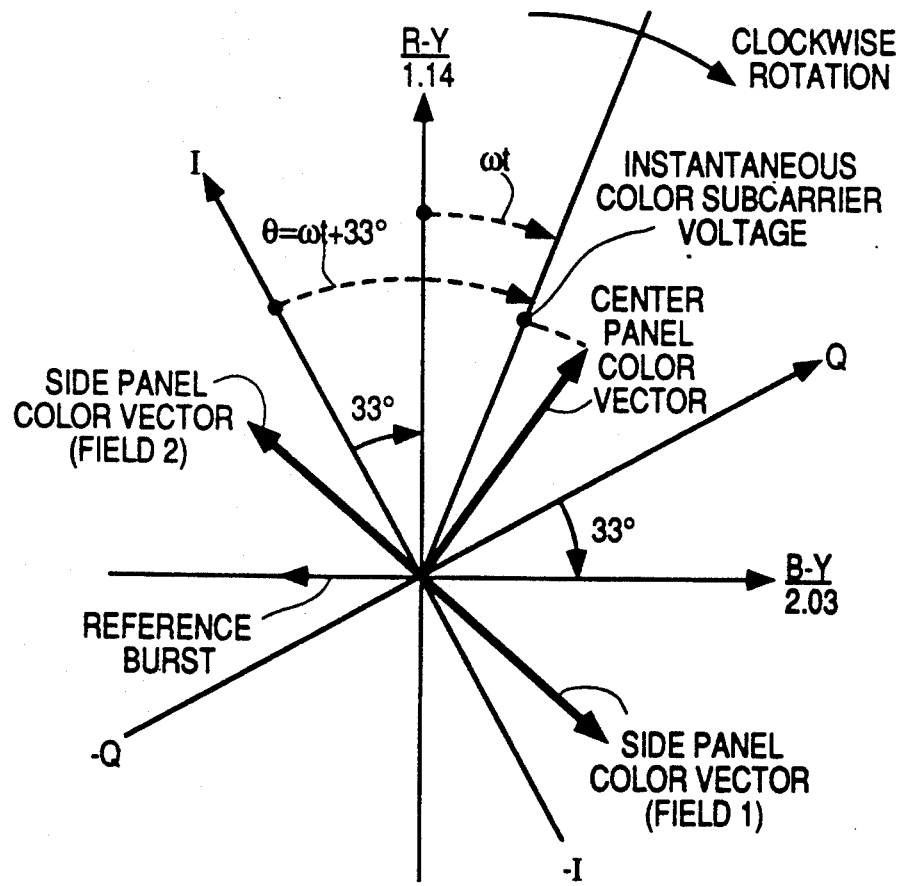
FIG. 7 is a vector diagram helpful in understanding the operation of the disclosed invention.

FIG. 1a depicts apparatus for generating quadrature chrominance subcarrier components SC and SC', and field phase modulated quadrature auxiliary carrier components ASC and ASC'. Before proceeding with a discussion of FIG. 1a, reference is made to the vector diagram shown in FIG. 7 as helpful background material. FIG. 7 is a chrominance vector diagram according to NTSC standards that has been modified to illustrate the operation of the present invention. Standard NTSC R−Y, B−Y, I and Q color phases and burst reference phase are illustrated. A vector designated as a "center panel color vector" is shown in FIG. 7. The magnitude and phase of this vector have no particular significance in this illustration other than to facilitate a clear presentation. Center panel IC and QC components are the projections of this vector on the I and Q axes respectively. The instantaneous voltage of the center panel chrominance subcarrier is the projection of this vector on the clockwise rotating line shown in FIG. 7.

The phase of the illustrated center panel color vector is that of a quadrature modulated standard chrominance subcarrier from modulator 25 in FIG. 1. The apparatus of FIG. 1a produces two quadrature auxiliary carriers, each of which is amplitude modulated with side panel chrominance information, and field phase modulated to reverse phase from field to field. These auxiliary carriers are combined by unit 65 in FIG. 1. A representation of the combined carrier output signal from unit 65 is illustrated in FIG. 7 as a "side panel color vector" that reverses phase from field 1 to field 2, and that remains in phase quadrature with the standard color subcarrier (center panel color vector) when the center and side panels are the same color. The sidepanel IS and QS components are the projections of the phase alternating side panel color vector on the I and Q axes respectively. The instantaneous voltage of the combined side panel carrier is the projection of the side panel color vector onto the clockwise rotating line shown in FIG. 7.

A signal generator 72 provides output subcarrier signal SC at the 3.58 MHz frequency of a standard NTSC color subcarrier illustratively of the form cos $\theta$. This signal is phase shifted −90° by a unit 74 to produce quadrature color subcarrier component SC' of the form sin $\theta$. Field phase modulated auxiliary carrier ASC is produced by control network 75 in response to the quadrature output signal from phase shifter 74 and a field rate switching control signal F. Unit 75 produces auxiliary carrier ASC with a phase that reverses from field to field compared to the phase of the standard chrominance subcarrier. For this purpose unit 75 includes an electronic switch 73, the position of which is controlled by field rate signal F. For one field the output signal from unit 74 is conveyed to the output of unit 75 via switch 73 and an inverter 76, with switch 73 in the position shown. For the next field switch 73 occupies the other position and the output of unit 74 is conveyed to the output of unit 75 directly. Output signal ASC from unit 75, of the form ± sin $\theta$, is phase shifted −90° by a unit 77 to produce auxiliary carrier ASC' of the form ∓ cos $\theta$. A composite amplitude modulated carrier signal with in-phase and quadrature components at the output of modulator 25 is of the form IC cos $\theta$ + QC sin $\theta$. A composite field phase and amplitude modulated auxiliary carrier with in-phase and quadrature components appears at the output of combiner 65 with the form ± (IS sin $\theta$ − QS cos $\theta$). Similar apparatus is employed at a receiver/decoder for developing corresponding demodulation reference signals SC, SC', ASC and ASC'.

The quadrature phase relationship of the auxiliary carrier components with the standard color subcarrier results in a dramatic improvement in the compatibility of the widescreen television signal with a standard NTSC signal compared with a conventional choice of phases for IS and QS, i.e., IS cos $\theta$ and QS sin $\theta$. By keeping the phase shift between the modulated Fukinuki-type auxiliary carrier and the modulated standard chrominance subcarrier at or in the vicinity of 90°, luminance flicker caused by interaction between chrominance information on the standard chrominance subcarrier and low frequency chrominance information on the auxiliary carrier components can be reduced significantly or eliminated. The flicker reduction is particularly good in the likely event that the main panel and side panel colors are the same. The specific nature of such luminance flicker has been described previously. Although a 90° phase shift has been found to produce the best results overall, a phase shift over a range of approximately 90°±15° has been found to reduce luminance flicker to a level which is either not noticeable or tolerably small, depending on conditions such as scene content and color.

Figure 2:
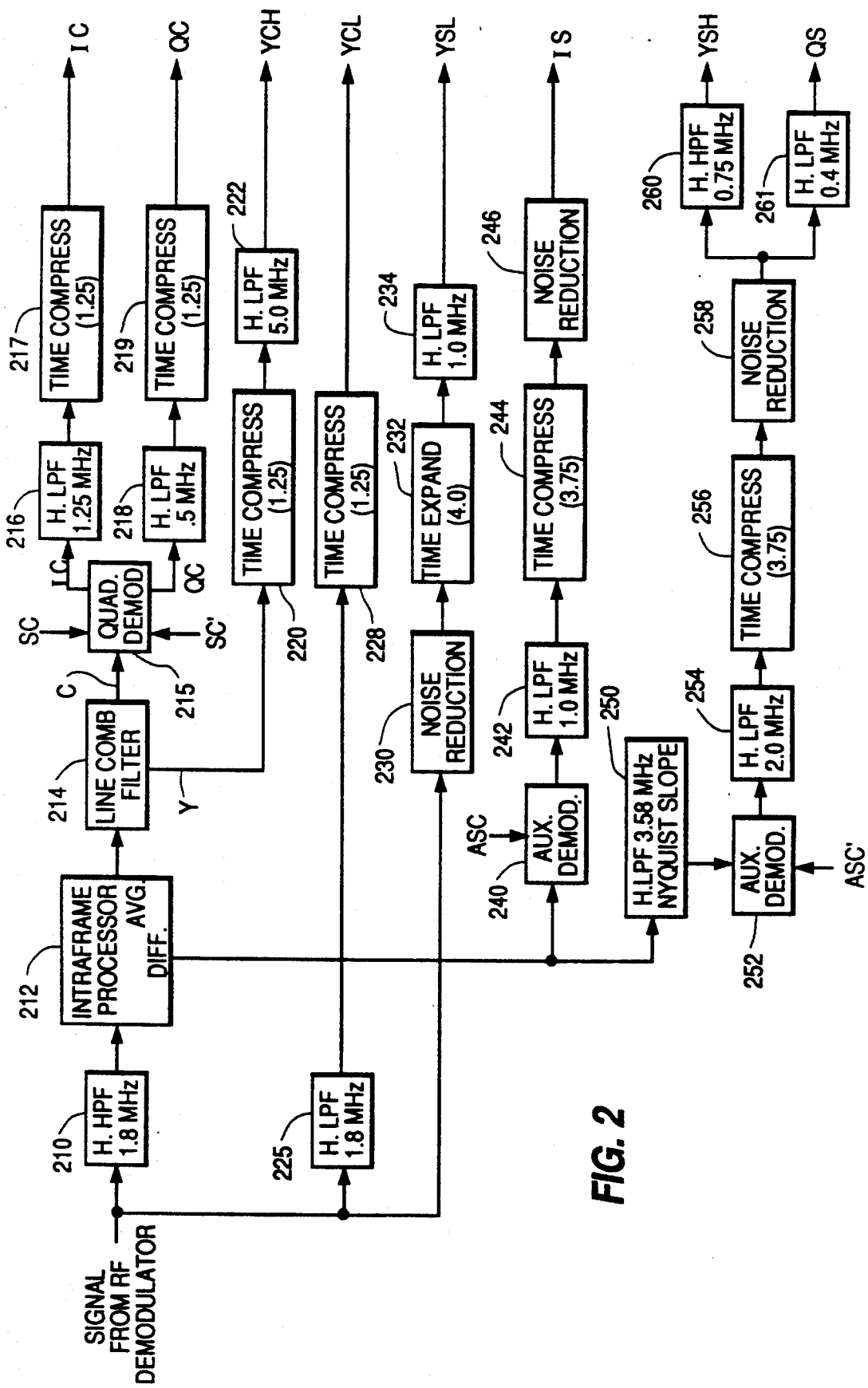
FIG. 2 shows a portion of an NTSC compatible widescreen receiver/decoder including apparatus according to the present invention.

FIG. 2 shows a portion of a widescreen television receiver including apparatus for decoding the compatible widescreen television signal generated by the arrangement of FIG. 1. A received baseband encoded signal (e.g., from an RF tuner and demodulator assembly not shown) is applied to a horizontal high pass filter 210, the output of which is applied to an intraframe processor 212. Processor 212 averages (additively combines) and differences (subtractively combines) image lines 262H apart within frames above 1.8 MHz to recover high frequency main panel signal information at an output AVG. Modulated side panel high frequency information is provided at a differencing output DIFF of processor 212.

The main panel component from the AVG output of processor 212 is filtered by a horizontal line comb filter 214 to provide separated luminance (Y) and chrominance (C) output components. The separated main panel luminance component is time compressed by a unit 220, which operates only during the main panel interval, to restore separated main panel component Y to its original spatial relationship. The time compressed signal from unit 220 is filtered by a horizontal low pass filter 222 to develop main (center) panel luminance high frequency component YCH. The separated main panel chrominance information (C) is quadrature demodulated by a standard chrominance demodulator 215 responsive to quadrature phased reference signals SC and SC' having the frequency and phase characteristics of corresponding subcarrier signals provided at the encoder/transmitter as discussed. Demodulated center panel I and Q color difference components IC and QC are horizontally low pass filtered by filters 216 and 218 respectively before being time compressed by units 217 and 219. Time compression units 217 and 219 operate during the center panel intervals to restore the original spatial relationship of signals IC and QC.

The center panel low frequency luminance information is restored to its original form by means of filter 225 and time compressor 228. Horizontal low pass filter 225 passes input signal frequencies below about 1.8 MHz to time compressor 228, which operates during the center panel interval to restore low frequency center panel luminance information to its original spatial relationship, as signal YCL.

The input signal is also applied to a noise reduction unit 230, which exhibits the complementary operating characteristics of unit 38 in the encoder of FIG. 1. A time expander 232 operates during the side panel intervals to restore the original spatial format of the side panel information which had been time compressed and placed in the horizontal overscan regions. The output signal from expander 232 is processed by a horizontal low pass filter 234 to provide low frequency side panel luminance signal YSL in its original spatial form.

To recover side panel I color difference component IS, the signal from the DIFF (differencing) output of intraframe processor 212 is demodulated by an auxiliary demodulator 240 which responds to a locally generated auxiliary reference signal ASC having the same frequency and phase characteristics as carrier ASC developed at the encoder as discussed. Auxiliary reference signal ASC as well as auxiliary reference signal ASC' mentioned below can be generated from a 3.58 MHz signal source in the manner shown in FIG. 1a. A field phase control unit corresponding to unit 75 in FIG. 1a alternatively can be placed in the signal path between the DIFF output of unit 212 in FIG. 2 and the inputs of units 240 and 250. The demodulated signal from unit 240 is filtered by a horizontal low pass filter 242, time compressed during side panel intervals by a unit 244 to restore the original spatial format of the signal component, and processed by a noise reduction unit 246 to produce side panel color I difference component IS. Noise reduction unit 246 and unit 46 at the encoder exhibit complementary operating characteristics.

To recover side panel components YSH and QS, the signal from the DIFF output of processor 212 is processed by a 3.58 MHz horizontal low pass Nyquist slope filter 250 before being demodulated by auxiliary demodulator 252. With regard to the use of Nyquist filter 250 it is noted that in this example component QS is a double sideband signal modulation component of auxiliary carrier ASC', and component YSH is a (lower) single sideband modulation component of auxiliary carrier ASC'. Imparting a Nyquist slope to the higher energy double sideband region of the combined YSH/QS modulated signal reduces the effective energy of the double sideband region by one-half, so that a flat demodulation amplitude response results over the auxiliary subcarrier modulation frequencies. Demodulator 252 also responds to a locally generated auxiliary reference signal ASC' having the same frequency and phase characteristics as auxiliary carrier ASC' developed at the encoder. A demodulated output signal from demodulator 252 contains combined YSH and QS components and is filtered by a horizontal low pass filter 254.

The output signal from filter 254 is time compressed by a unit 256 which operates during side panel intervals to restore the original spatial relationship of the combined YSH/QS side panel information. The time compressed signal is then processed by a noise reduction unit 258, which exhibits the complementary operating characteristics of unit 46 in the encoder system of FIG. 1. The output signal from noise reduction unit 258 is separated into the YSH and QS components by means of a horizontal high pass filter 260 and a horizontal low pass filter 261, respectively.

Figure 3:
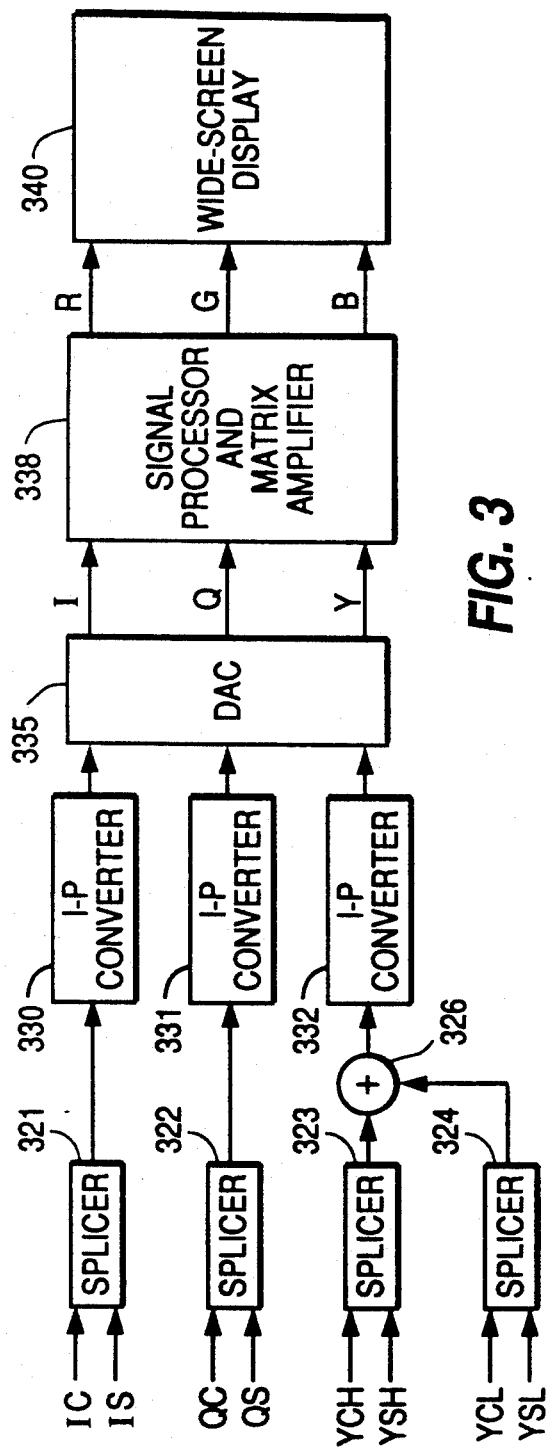
FIG. 3 shows an additional portion of the receiver/decoder of FIG. 2.

The output signals developed by the decoder apparatus of FIG. 2 are processed further as shown in FIG. 3. Signals IC and IS, QC and QS, YCH and YSH, and YCL and YSL are spliced by splicers 321, 322, 323 and 324 respectively. Output signals from splicers 323 and 324 are combined by an adder 326 to provide a restored widescreen luminance signal with main panel and side panel information. The widescreen chrominance signals from splicers 321 and 322 and the widescreen luminance signal from adder 326 are converted from interlaced to progressive scan format by means of converters 330-332 before being converted to analog form via a digital-to-analog converter unit 335. Widescreen analog signals I, Q, Y are matrixed and processed by conventional video signal processing circuits in a network 338 to produce color image representative signals R, G and B suitable for display by a widescreen image reproducing device 340 having a nonlinear transfer characteristic, e.g., a kinescope.

Figure 5:
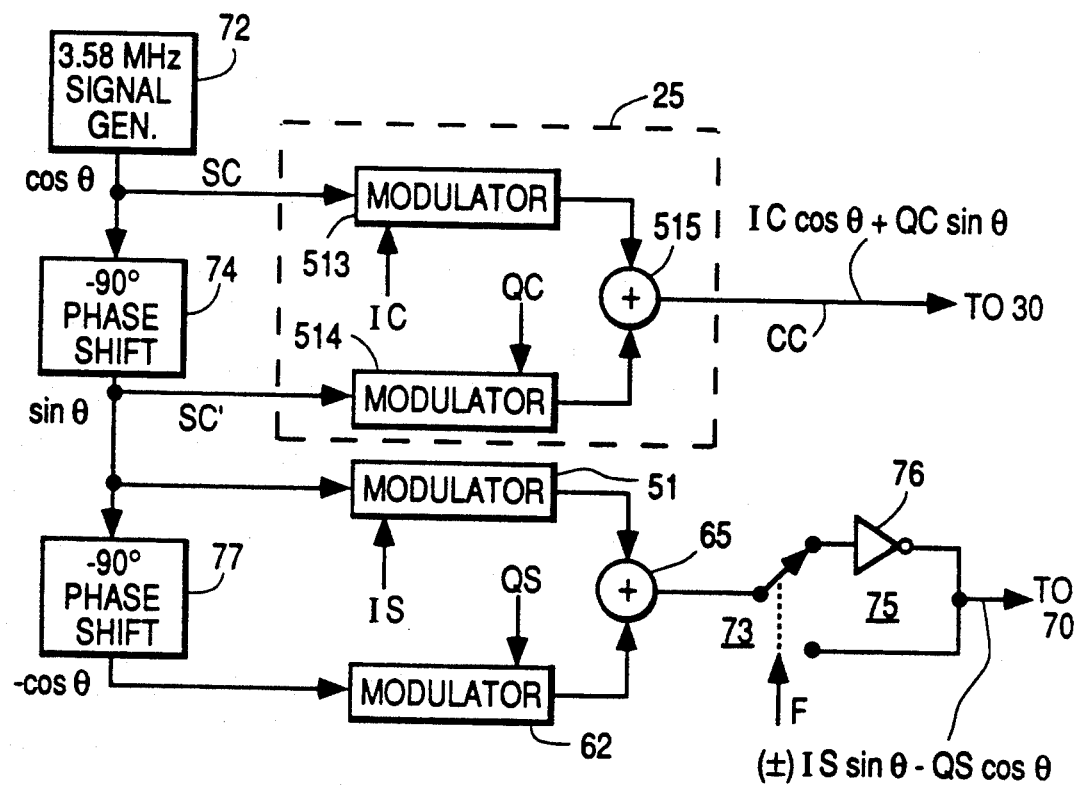
FIGS. 5 and 6 show alternative embodiments of apparatus according to the invention for developing a modulated auxiliary carrier signal.

FIG. 5 shows alternative apparatus for generating modulated auxiliary carrier signals. The apparatus of FIG. 5 is similar to that shown in FIG. 1a in combination with FIG. 1, except as to the manner in which phase inversion is performed from field to field. In FIG. 5 field phase control unit 75 operates on the modulated auxiliary carrier from adder 65, whereas in contrast in FIGS. 1 and 1a unit 75 operates on the auxiliary carrier before modulation. Elements that are similar in FIGS. 1, 1a and 5 are identified by the same reference number. In FIG. 5 quadrature modulator 25 is shown as including an in-phase modulator 513, a quadrature modulator 514 and a combiner 515 for summing output signals from modulators 513 and 514.

Figure 6:
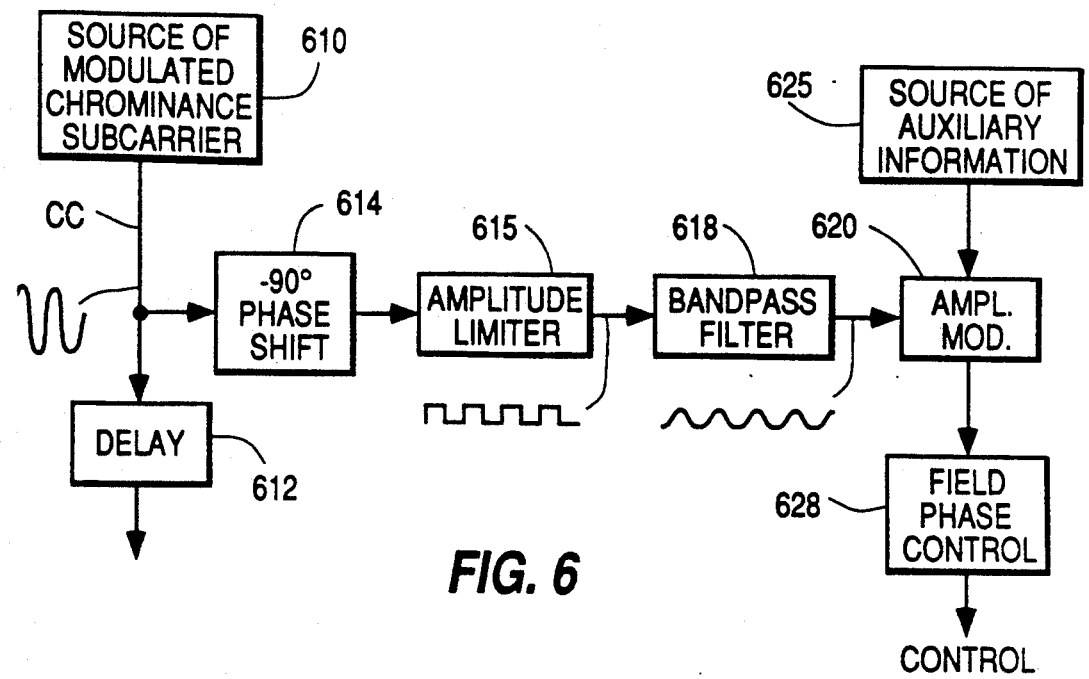

FIG. 6 shows another alternative apparatus for generating a modulated auxiliary carrier signal. The FIG. 6 embodiment addresses a situation where, in contrast to the arrangement of FIG. 1, only one auxiliary carrier is to be modulated with a particular type of information. In accordance with this embodiment, the auxiliary carrier is developed such that the modulating auxiliary information remains displaced substantially 90° from the color information modulating the standard chrominance subcarrier. In the apparatus of FIG. 6 the auxiliary carrier is derived from the phase and amplitude modulated chrominance carrier (signal CC in FIG. 1). A source 610 provides a modulated chrominance subcarrier (e.g., signal CC in FIG. 1). This signal is delayed by a unit 612 to equalize the transit time of signal CC with that of auxiliary (side panel) information so that input signals received by adder 70 (FIG. 1) are synchronized. In particular, this delay compensates for a signal processing delay in a signal processing path for developing modulated auxiliary carrier as follows.

The phase and amplitude modulated chrominance subcarrier from source 610 is phase shifted −90° by a unit 614, then amplitude limited by a unit 615. Limiter 615 removes the amplitude modulation information of the modulated chrominance subcarrier without removing phase information. The limited signal from unit 615 is bandpass filtered by a filter 618 to produce a substantially sinusoidal 3.58 MHz output signal. Filter 618 illustratively exhibits a 1.5 MHz passband centered about 3.58 MHz. The sinusoidal signal from filter 618 is applied to a carrier input of an amplitude modulator 620, another input of which receives first auxiliary modulation information (e.g., side panel information) from a source 625. The amplitude modulated 3.58 MHz carrier from modulator 620 is phase modulated by a field phase control unit 628 to produce a modulated auxiliary carrier with a phase that reverses from field to field. The modulating information may benefit from being intraframe processed to facilitate signal recovery at a decoder.

At a receiver/decoder, the amplitude modulation information as provided by source 625 is recovered by an amplitude demodulator responsive to a sinusoidal reference signal at the 3.58 MHz chrominance subcarrier frequency and having a phase that reverses from field to field like the modulated auxiliary carrier. The sinusoidal reference signal can be developed from the chrominance subcarrier in the manner shown in FIG. 6, or developed independently by other means.

Although the invention has been disclosed in the context of a compatible widescreen television system including an auxiliary carrier modulated with side panel image information, it should be appreciated that other applications of the invention are also possible for adding various types of information to NTSC or PAL television systems in a compatible manner.

What is claimed is:

1. In a system for processing a color television signal, apparatus comprising:
means for providing a chrominance subcarrier signal at a given frequency modulated with television information;
means for providing first and second auxiliary carriers at said given frequency;
first signal processing means responsive to said first auxiliary carrier and to television information for providing a first auxiliary carrier modulated with television information and exhibiting field rate modulation and a significant phase shift relative to said chrominance subcarrier independent of said field rate modulation;
second signal processing means responsive to said second auxiliary carrier and to television information for providing a second auxiliary carrier modulated with television information and exhibiting field rate modulation and a significant phase shift relative to said chrominance subcarrier independent of said field rate modulation;
means for combining said modulated first and second auxiliary carriers to produce a composite modulated auxiliary carrier; and
means for combining said modulated chrominance subcarrier and said composite modulated auxiliary carrier.

2. Apparatus according to claim 1, wherein
said first and second auxiliary carriers exhibit phase reversal from field to field, said first auxiliary carrier exhibits a phase shift of approximately −90°±15° relative to said chrominance subcarrier, and said second auxiliary carrier exhibits a phase shift of approximately −90°±15° relative to said first auxiliary carrier.

3. Apparatus according to claim 1, wherein
said modulated chrominance subcarrier includes first and second components and is of the form $A \cos \theta + B \sin \theta$; and
said composite modulated auxiliary carrier includes first and second components of the form $C \sin \theta - D \cos \theta$.

4. Apparatus according to claim 1, wherein
said television signal is a widescreen television signal representative of a wide aspect ratio image compared to a standard television signal image and containing main panel and side panel image information;
said chrominance subcarrier is modulated with main panel chrominance information; and
at least one of said first and second auxiliary carriers is modulated with side panel chrominance information.

5. Apparatus according to claim 4, wherein
said first and second auxiliary carriers exhibit phase reversal from field to field and a substantially quadrature phase relationship; and
said first auxiliary carrier exhibits a substantially quadrature phase relationship with said chrominance subcarrier.

6. In a system for processing a color television signal, apparatus comprising;
means for providing a chrominance subcarrier signal at a given frequency modulated with television information;
means for providing first and second auxiliary carriers at said given frequency;
first signal processing means responsive to said first auxiliary carrier and to television information for providing a first auxiliary carrier modulated with television information and exhibiting field rate modulation and a significant phase shift relative to said chrominance subcarrier;
second signal processing means responsive to said second auxiliary carrier and to television information for providing a second auxiliary carrier modulated with television information and exhibiting field rate modulation and a significant phase shift relative to said chrominance subcarrier;
means for combining said modulated first and second auxiliary carriers to produce a composite modulated auxiliary carrier; and
means for combining said modulated chrominance subcarrier and said composite modulated auxiliary carrier, wherein said first and second auxiliary carriers are respectively modulated with first and second types of color difference information.

7. Apparatus according to claim 6, wherein
said chrominance subcarrier is quadrature modulated with "I" and "Q" main panel color difference signal information and is of the form I cos θ + Q sin θ; and
said first and second auxiliary carriers are respectively modulated with "I" side panel color difference information and with "Q" side panel color difference information, said composite modulated auxiliary carrier being of the form I sin θ − Q cos θ.

8. In a system for processing a color television signal, apparatus comprising:
means for providing an amplitude and phase modulated chrominance subcarrier;
means for phase shifting said modulated chrominance subcarrier approximately 90° to produce a phase shifted signal;
means for amplitude limiting said phase shifted signal to produce a limited signal;
means for filtering said limited signal to produce a substantially sinusoidal signal;
means for amplitude modulating said sinusoidal signal with television information to produce a modulated signal; and
means for inverting the phase of said modulated signal from field to field.

9. In a receiver for processing a color television signal including a chrominance subcarrier at a given frequency modulated with television information, and a composite auxiliary signal comprising first and second field phase modulated auxiliary carriers at said given frequency exhibiting a significant phase shift relative to said chrominance subcarrier independent of field phase modulation and being modulated with television information; apparatus comprising:
means responsive to said television signal and to first and second field phase controlled reference signals respectively for demodulating said first and second auxiliary carriers to provide demodulated auxiliary information;
means responsive to said television signal and to a chrominance reference signal for demodulating said chrominance subcarrier to provide demodulated chrominance information; and
video signal processing means responsive to said demodulated auxiliary information and to said demodulated chrominance information for producing an image representative signal.

10. Apparatus according to claim 9 and further including
intraframe processing means responsive to said television signal for providing said modulated chrominance subcarrier at a first output and a signal including said modulated first and second auxiliary carriers at a second output.

11. Apparatus according to claim 9, wherein
said television signal is a widescreen television signal representative of a wide aspect ratio image compared to a standard television signal image and containing main panel and side panel image information;
said demodulated television chrominance signal contains main panel chrominance information; and
said demodulated auxiliary information is side panel chrominance information.

12. Apparatus according to claim 9, wherein
said first and second reference signals exhibit phase reversal from field to field.

13. Apparatus according to claim 9 wherein
said first and second auxiliary carriers exhibit a substantially quadrature phase relationship.

14. Apparatus according to claim 9, wherein
said first reference signal exhibits a substantially quadrature phase relationship with said chrominance reference signal; and
said second reference signal exhibits a substantially quadrature phase relationship with said first reference signal.

15. In a receiver for processing a color television signal including a chrominance subcarrier at a given frequency modulated with television information, and a composite auxiliary signal comprising first and second field phase modulated auxiliary carriers at said given frequency exhibiting a significant phase shift relative to said chrominance subcarrier and being modulated with television information; apparatus comprising:
means responsive to said television signal and to first and second field phase controlled reference signals respectively for demodulating said first and second auxiliary carriers to provide demodulated auxiliary information;
means responsive to said television signal and to a chrominance reference signal for demodulating said chrominance subcarrier to provide demodulated chrominance information; and
video signal processing means responsive to said demodulated auxiliary information and to said demodulated chrominance information for producing an image representative signal, wherein
said demodulated auxiliary signals contain first and second types of color difference signal information, respectively.

16. In a receiver for processing a color television signal including a chrominance subcarrier at a given frequency modulated with television information, and a composite auxiliary signal comprising first and second field phase modulated auxiliary carriers at said given frequency exhibiting a significant phase shift relative to said chrominance subcarrier and being modulated with television information; apparatus comprising:
means responsive to said television signal and to first and second field phase controlled reference signals respectively for demodulating said first and second auxiliary carriers to provide demodulated auxiliary information;
means responsive to said television signal and to a chrominance reference signal for demodulating said chrominance subcarrier to provide demodulated chrominance information; and
video signal processing means responsive to said demodulated auxiliary information and to said demodulated chrominance information for producing an image representative signal, wherein
said demodulated television chrominance signal contains an "I" color difference component and a "Q" color difference component;
said demodulated auxiliary signal contains side panel "I" color difference information and
said demodulated additional auxiliary signal contains side panel "Q" color difference information.

17. Apparatus according to claim 9, wherein said modulated chrominance subcarrier includes first and second components and is of the form $A \cos \theta + B \sin \theta$; and said composite auxiliary signal including said first and second auxiliary carriers is of the form $C \sin \theta - D \cos \theta$.

18. Apparatus according to claim 16, wherein
said first and second reference signals are in phase quadrature and exhibit phase reversal from field to field; and
said first reference signal is in phase quadrature with said chrominance reference signal.

* * * * *